United States Patent
Rosenbaum et al.

(10) Patent No.: US 7,681,461 B2
(45) Date of Patent: Mar. 23, 2010

(54) PIPE ADAPTER FOR ADJUSTING THE FLOW PAST A SENSOR

(76) Inventors: Amir Rosenbaum, 1720 S. Carlos Ave., Ontario, CA (US) 91761; Pilun Alan Chen, 1720 S. Carlos Ave., Ontario, CA (US) 91761

( * ) Notice: Subject to any disclaimer, the term of this patent is extended or adjusted under 35 U.S.C. 154(b) by 690 days.

(21) Appl. No.: 11/516,258

(22) Filed: Sep. 6, 2006

(65) Prior Publication Data
US 2008/0072979 A1  Mar. 27, 2008

(51) Int. Cl.
*G01F 1/37* (2006.01)
(52) U.S. Cl. .................................................. 73/861.52
(58) Field of Classification Search ............. 73/861.63, 73/861.64, 861.52, 861.61, 861.04, 861.06, 73/197, 198, 861.53; 340/605
See application file for complete search history.

(56) References Cited

U.S. PATENT DOCUMENTS

| | | | |
|---|---|---|---|
| 3,129,587 A | 4/1964 | Hallanger | |
| 3,795,145 A | 3/1974 | Miller | |
| 4,006,634 A | 2/1977 | Billette et al. | |
| 4,083,244 A | 4/1978 | Agar et al. | |
| 4,317,374 A * | 3/1982 | Casey | 73/861.53 |
| 4,691,740 A | 9/1987 | Svetlilk et al. | |
| 5,483,838 A * | 1/1996 | Holden | 73/861.61 |
| 5,980,466 A | 11/1999 | Thomson | |
| 6,053,055 A | 4/2000 | Nelson | |
| 6,121,884 A * | 9/2000 | Ekermans | 340/605 |
| 6,182,644 B1 * | 2/2001 | Kotwicki et al. | 123/568.16 |
| 6,339,963 B1 * | 1/2002 | Torkildsen | 73/861.63 |
| 6,467,359 B1 * | 10/2002 | Atwood | 73/861.63 |

\* cited by examiner

*Primary Examiner*—Jewel Thompson
(74) *Attorney, Agent, or Firm*—Kirk A. Buhler

(57) ABSTRACT

An adapter for a pipe is disclosed where the adapter changes the effective inside diameter of the tube to increase the airspeed flowing through the area where the adapter is placed. The adapter is utilized in automobiles where to adjust engine parameters based upon the requirements from the various sensors. This allows original sensors to be used in pipe while providing the overall appearance of a larger section of pipe. A kit including a number of nesting adapters is provided to allow altering of the cross sectional area of the pipe. The location of the sensor is maintained in the center of the pipe and the adapter(s) engage, nest, or connect to cause a progressive reduction of the pipe diameter until the optimal air flow speed is achieved based upon the requirements of the sensor.

20 Claims, 5 Drawing Sheets

PIPE ADAPTER FOR ADJUSTING THE FLOW PAST A SENSOR

FIELD OF THE INVENTION

This invention relates to an adapter for flow sensor. More particularly, the adapter is utilized in automobiles where to adjust engine parameters based upon the requirements from various sensors. The adapter is one or more sleeves that are placed within an airflow tube to restrict the diameter of the tube resulting in an increase in the air speed through the area of the pipe where the adapter is placed.

BACKGROUND OF THE INVENTION

When modifying air intake and air flow pipes in customized vehicles it is often desirable to utilize pipes or tubes that are different in diameter than the pipes or tubes that the vehicle was designed with. The alteration of inside diameter of the pipe often creates a difference in the flow characteristics of air that moves through the pipes or tubes. Changing the cross sectional area of the pipe or tube will alter the information monitored by sensors placed within the tubes or pipes. Several solutions will allow the correct information to be monitored by the sensors. One option is to locate a sensor that can be used with the different size pipe or tube. Because of the large number of variations in sensors and pipe diameters, locating an acceptable sensor would be an involved and possibly futile effort. Another option, as proposed in this application is to utilize the pipe with one or more adapter sleeves that make the inside diameter equivalent to the inside diameter of the original equipment pipe or tube. Some patents have been issued to try and alter the size or diameter of a pipe or tube where sensors are used. Exemplary examples can be found in the patents identified herein.

U.S. Pat. No. 3,795,145 issued to Harry Miller on Mar. 5, 1974 discloses a Variable Throat Venturi Airspeed Sensor. This patent uses a section of pipe where a hinged arm is articulated to reduce the area of the pipe. Pressure sensors are placed both before the restriction and at the apex of the restriction. While this patent discloses an alteration of the flow within the tube the size of the alteration is not performed with sleeves. The sensor is not an $O_2$ or a Mass Air Flow Sensor used in an automotive application.

U.S. Pat. No. 4,006,634 issued to Richard J. Billette et al. on Feb. 8, 1977 discloses a Flow Meter with a changeable restriction in the pipe. While the restriction is variable by using different size an orifice, the restriction is not a sleeve that extends over the area where the sensor(s) is/are located. The sensors in this patent are pressure sensors and are used to determine the pressure change before and after the restrictive orifice. The sensor is not an $O_2$ or a Mass Air Flow Sensor used in an automotive application.

U.S. Pat. No. 4,083,244 issued to Jason Agar et al. on Apr. 11, 1978 discloses a Method and Apparatus for Measuring Fluid Flow and/or for Exercising a Control in dependencies thereon. A variety of different shaped restrictions are disclosed to determine the result of having the restriction within the pipe. The patent uses thermistors placed within the airflow that are electrically heated and cooled with the airflow to determine the characteristics of the airflow within the tube. The sensor is not an $O_2$ or a Mass Air Flow Sensor used in an automotive application.

U.S. Pat. No. 4,691,740 issued to Harvey E. Svetik et al. on Sep. 8, 1987 discloses a Pipeline Lining for pipe. This patent is a lining that is threaded into an existing pipe and it effectively alters the inside diameter of the pipe. While this patent discloses a means to alter the inside diameter of a pipe, the entire length of the pipe is altered, and there are no sensors that monitor the flow through the pipe. The only opening is for a vent for evacuating the air between the inside and outside pipe.

U.S. Pat. No. 6,053,055 issued to Lloyd E. Nelson on Apr. 25, 2000 discloses a Multi-Port Orifice Meter Fitting. The meter fitting-includes two outer plates with a rotatable orifice plate located between the two outer plates. While the purpose of this patent is to allow for replacement of an orifice without the need to open the pipe and replace the orifice, the patent could be used with orifices of different diameter to alter the flow rate through the orifice. While the flow rate through the orifice is different than the flow through the pipe, there is no monitoring means to measure the flow located within the orifice.

What is needed is a flow adapter with insert sleeves of various diameters that fit within a section of pipe to alter the flow to tune the flow for a sensor placed within the section or pipe and the adapter sleeve.

BRIEF SUMMARY OF THE INVENTION

It is an object of the adapter for an air flow sensor to alter the cross sectional area of the pipe to adjust the air flow through the adapter to match the air flow with the sensor.

It is an object of the adapter for an air flow sensor to provide a plurality of sleeve inserts to allow a user to vary the flow rate past a sensor to optimize the flow rate to match the sensor.

It is an object of the adapter for an air flow sensor to allow multiple flow altering sleeves to be nested to alter the flow rate to different degrees.

It is another object of the adapter for an air flow sensor to provide a clearance in the insert sleeve(s) to allow for straddling a sensor.

It is another object of the adapter to allow for installation and removal of the sleeve without requiring the removal of the sensor.

It is another object of the adapter to provide the adapter with spacers or couplers for use with various sensors to accommodate hole pattern and dimensional variations of different sensors to adapt the sensor to the pipe adapter as well as allowing the height of the sensor to be adjusted relative to the center of the pipe adapter.

It is still another object of the adapter for an air flow sensor to provide a plenum where the sensor is placed within the center of the sleeve to tune the air flow with the sensor requirements.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
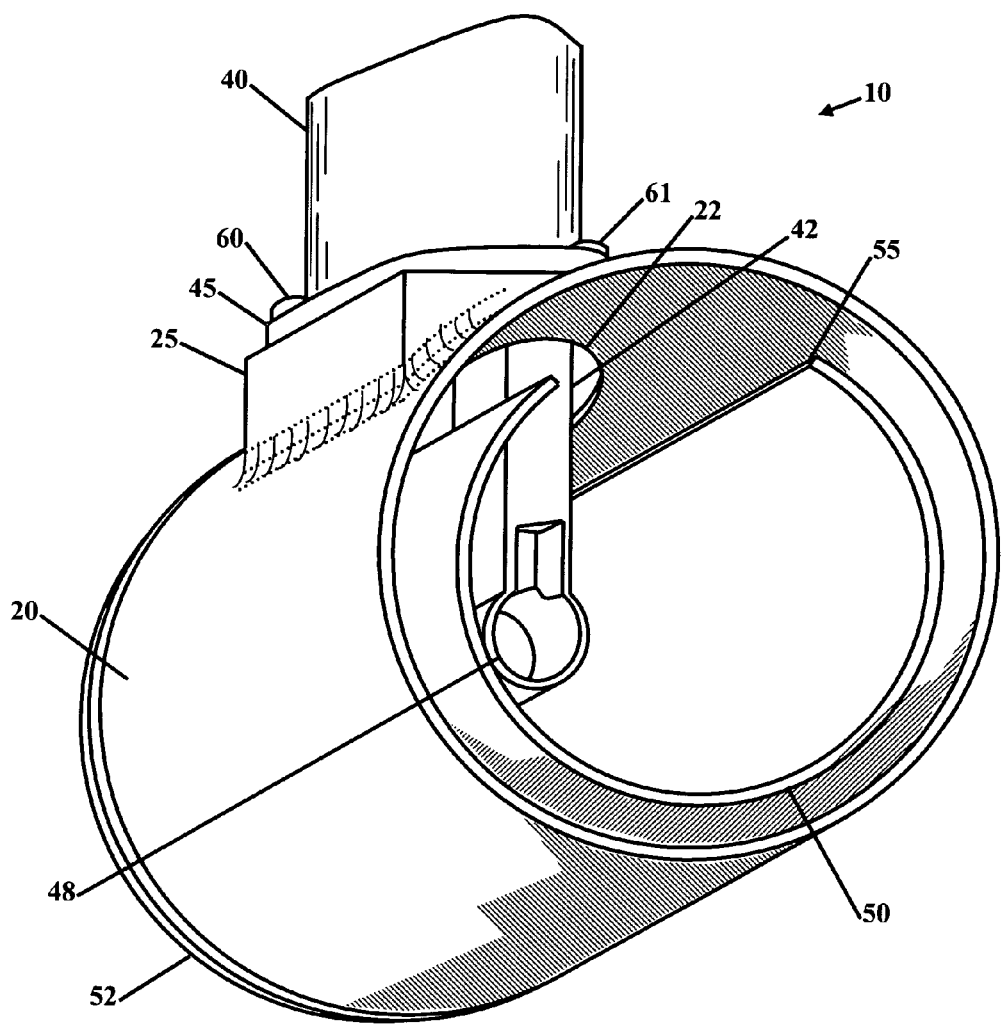
FIG. 1 shows an isometric view looking partially through a pipe with an insert and a flow sensor.

FIG. 1 shows an isometric view looking partially through a pipe with an insert and a flow sensor. The adapter 10 includes an outer pipe 20 that houses the sleeve(s) 50 and allows for attachment of the sensor 40. In one embodiment the pipe is fabricated from tubular stock, where a saddle 25 is welded over an opening 22 where the sensor is placed through. In another contemplated embodiment the outer pipe 20 and saddle 25 is molded or cast as a single unit. The top of the saddle 25 includes mounting holes for securing a sensor 40. In the intended use the adapter is intended for use in the plenum of a motor vehicle and the sensor is standard sensor intended for use with the specific engine and or vehicle. The sensor 40 senses air speed, air flow, mass air flow, or other similar parameter, and the data is sent to a engine for regulation or control of other engine related parameters.

In most vehicles the size of the pipe and sensor are designed as a package. For example the sensor is designed with a 2 inch diameter pipe. Modifications to the plenum increase the pipe diameter to 3 inches where the cross sectional area of the pipe is more than doubled, resulting in a significant reduction in the air flow speed past the sensor. In order to return the air speed to original speed and keep the appearance of the larger diameter pipe, the insert 50 is placed within the pipe 20 to return the air speed past the sensor to the original speed. The pipe 20 and the saddle 25 have an opening 42 that extends from the outside of the pipe to the inside of the pipe for the sensor 40 such that the sensing portion 48 of the sensor in approximately the center of the pipe. The sensor has one or more flanges or ears 45 that extend from the body of the sensor for mounting the sensor. In the embodiment shown, one ear is held onto the saddle with a threaded fastener 60. The sensing portion 48 in the embodiment shown consists of a through hole with the sensor placed within the hole. A cutout 55 in the insert 50 allows the insert to slide past an installed sensor without causing a significant change in the flow past the sensor. A shoulder on the insert or sleeve 50 maintains the insert concentric with the pipe and the shoulder on the insert prevents the insert from sliding into the pipe.

Various adapters attach to saddle 25 to allow attachment of various sensors to the same pipe 20 and saddle 25. When using the adapter in conjunction with an adjacent pipe the shoulder on sleeve 50 located the insert in the axial direction.

Figure 2:
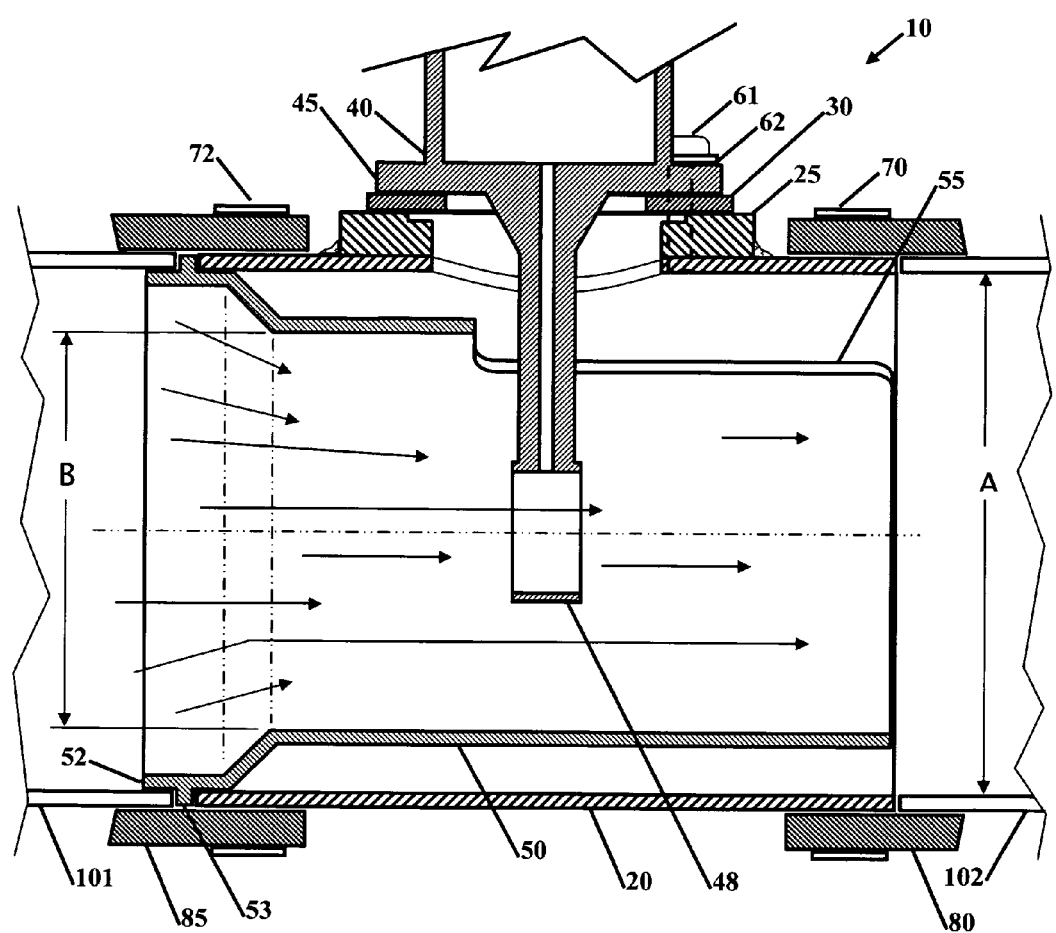
FIG. 2 shows a cross sectional view of the pipe an insert, and the flow sensor in a flow stream.

FIG. 2 shows a cross sectional view of the pipe adapter 10 inside pipe 20 with insert 50, and the flow sensor in a flow stream. The assembly 10, the sleeve insert 50, pipe 20 and the sensor 40 is shown with connecting pipe 85 feeding into the assembly 10 connecting pipe 80 where the flow exits the assembly. Ring, pinch or similar clams 70 and 72 with rubber couplers or similar connectors 80 and 85 to secure the assembly 10 to the incoming pipe 101 and the outgoing pipe 102. The insert 50 starts with the same or similar inside diameter "A" as the pipe 20 where the flow enters. The flow is shown as a series of arrows in this figure entering the wide portion of the insert and being compressed and accelerating as they pass through the insert 50. The inside diameter of the pipe "A" and the minimal inside diameter of the insert "B" provides mathematical ratio of the cross sectional area of the flow area and the change is flow rate using a ratio of the diameters as shown mathematically below.

$$\text{Air Speed ratio} = \frac{(A/2)^2}{(B/2)^2} \text{ or } \frac{A^2}{B^2}$$

Using the previous example of a 3 inch original inside diameter and a 2 inch inside diameter of the insert the Air Speed ratio is shown below.

$$\text{Air Speed ratio} = \frac{A^2}{B^2} = \frac{3^2}{2^2} = \frac{9}{4} = 2.25$$

Figure 7:
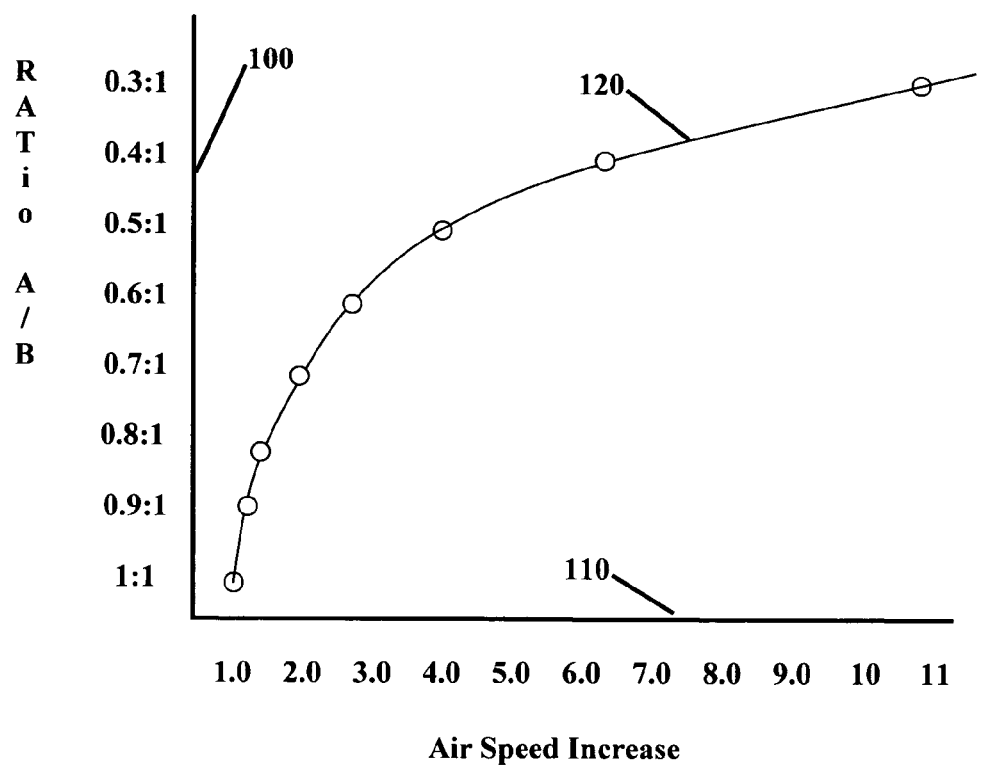
FIG. 7 shows a chart showing the resulting difference in flow with a change in the inside diameter of a pipe as a result of an insert being placed within the tube.

In this example the flow speed is increased 2.25 times. Referring to FIG. 7 that shows a chart with the resulting difference in flow with a change in the inside diameter of a pipe as a result of an insert being placed within the tube. In this chart the Y axis or ordinate shows the ratio of diameters A/B. The X axis or abscissa shows the Air Speed Increase. The line 120 plots the two factors. In application the inside diameter of the insert sleeve is determined from documentation provided by the manufacturer of the sensor or from measurement of the prior installed pipe, but the use of an insert with larger or smaller diameter may be preferred to alter vehicle performance.

Referring back to the cross sectional view shown in FIG. 2. The body of the sensor 40 encloses connectors or other electronics. The ear 45 is shown with a screw, both or other fastener 61 installed on a washer 62 securing the sensor onto the saddle 25 through an adapter, gasket or spacer 30. In this figure the adapter 30 is shown as a thin plate, but the thickness of the adapter and the features of the adapter are variable to allow mating of the sensor 40 to the saddle 25. The adapter or spacer 30 further allows for vertical positioning of the sensor to ensure the center of the sensor 48 is optimally placed concentric with the pipe 20 and the insert or sleeve 50. A leading edge 52 of the insert sleeve is shown extending from the pipe 20. A stop or shoulder 53 on the insert sleeve prevents the insert sleeve from pushing into the pipe 20 or into adjacent inlet pipe 101. A cutout 55 in the insert 50 allows the insert to slide past an installed sensor without causing a significant change in the air flow pattern past the sensor.

Figure 3:
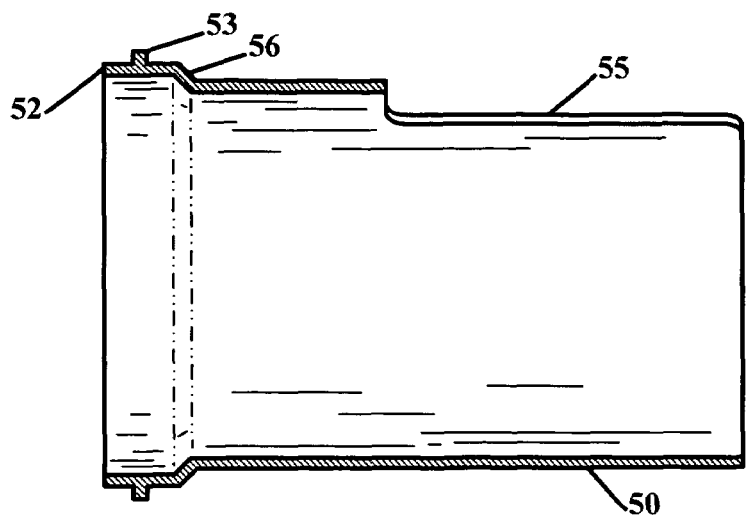
FIG. 3 shows a large diameter insert.
Figure 4:
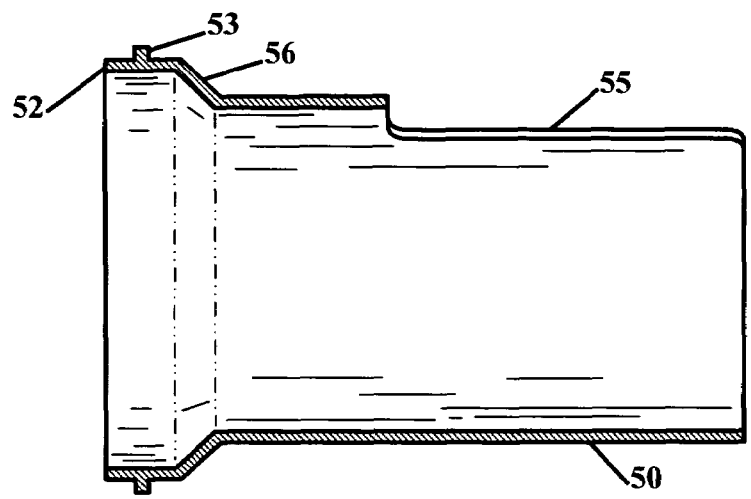
FIG. 4 shows a medium diameter insert.
Figure 5:
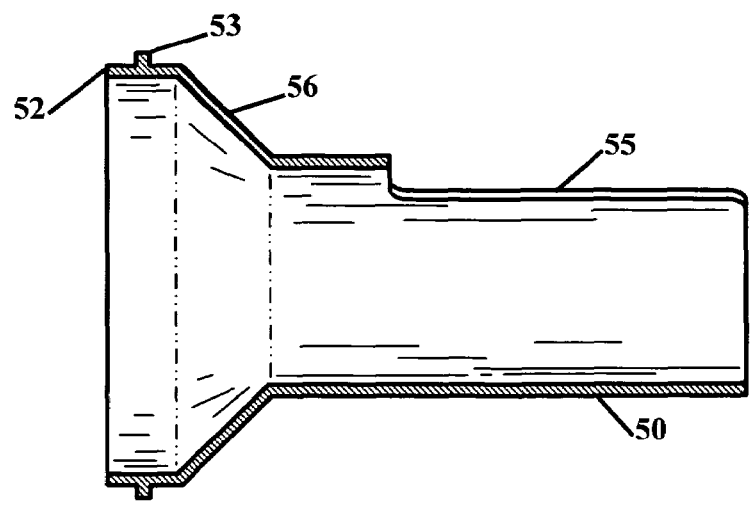
FIG. 5 shows a smaller diameter insert.
Figure 6:
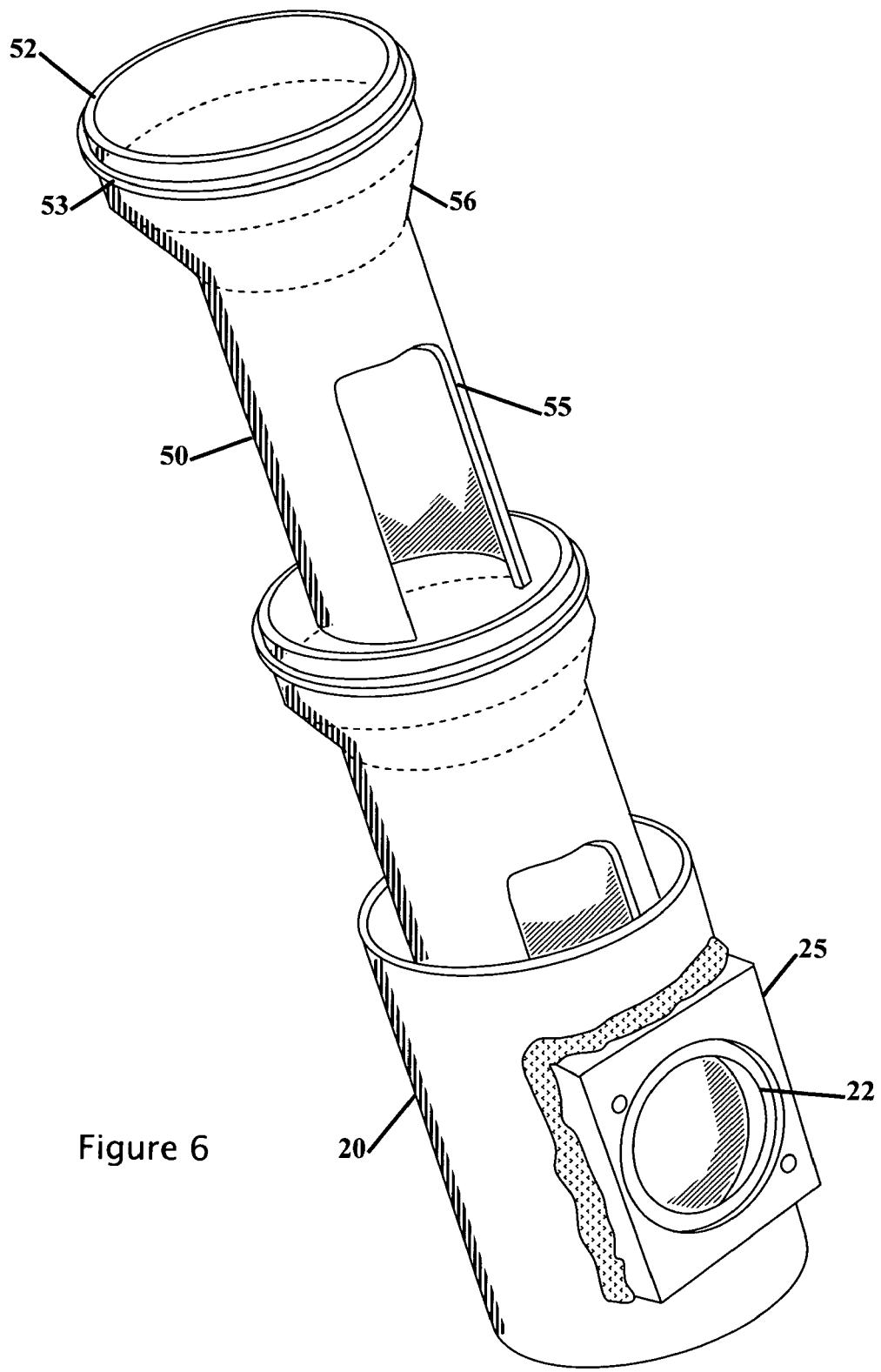
FIG. 6 shows multiple inserts inserted within a section of pipe.

FIGS. 3 to 5 show various diameters of insert sleeve 50 where the insert sleeve in FIG. 3 has the greatest inside diameter, the insert sleeve in FIG. 5 has the smallest inside diameter and the insert sleeve shown in FIG. 4 shows a diameter between the insert sleeves of FIGS. 3 and 5. While only three inserts with different diameters are shown in FIGS. 3 to 5 it is contemplated that other insert sleeves with diameters larger, smaller, and between the sizes shown encompass the disclosure. The inserts are usable separately or collectively as shown in FIG. 6. In FIGS. 3 to 5, different sizes of sleeve inserts 50 of different sized reduced diameters all have the same initial inside diameter. A leading edge 52 of the insert sleeve is shown extending from the pipe. A cutout 55 in the sleeve insert 50 allows the insert to slide past an installed sensor without causing a significant change in the air flow past the sensor. A stop or shoulder 53 on the insert sleeve prevents the insert sleeve from pushing into the pipe. The taper 56 on the pipe transitions the sleeve insert from the larger initial diameter to the smaller final diameter. It should be noted here that once the flow has passed the end of the pipe the pipe widens to the initial diameter such that the reduction is only present in the area where the sensor is located.

FIG. 6 shows multiple inserts inserted within a section of pipe. In practice it is unlikely that a user would install or nest multiple sleeve inserts 50, one within the next, but because the sleeve inserts have progressively narrowing diameters it is possible as shown in this figure. A leading edge 52 of the insert sleeve is shown extending from the pipe. A cutout 55 in the sleeve insert 50 allows the insert to slide past an installed sensor without causing a significant change in the air flow past the sensor. A stop or shoulder 53 on the insert sleeve prevents the insert sleeve from pushing into the pipe 20. The taper 56 on the pipe transitions the sleeve insert from the larger initial diameter to the smaller final diameter. This view shows the pipe 20 with the saddle 25 and the hole 22 where the sensor is inserted. In these figures the sleeve insert 50 is simply slid into the pipe 20 it is also contemplated that the insert sleeve can screw into the pipe or be engaged in a bayonet type locking configuration. It is further contemplated that the cut-out area 55 be eliminated, thus requiring the sensor be removed to install a sleeve insert with a different diameter.

Thus, specific embodiments of a pipe with flow altering sleeves have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A pipe adapter for altering flow through the pipe comprising:
    a sensor with flow requirements placed within the section of tubing for conducting flow;
    at least one sleeve with an outside diameter that effectively matches the inside diameter of the section of tube for conducting flow;
    an inside diameter that alters the flow within the section of tubing for altering the flow to match the flow requirements to the sensor, and
    an adapter to accommodate hole pattern and dimensional variations of different sensors to adapt the sensor to the pipe adapter.

2. The pipe adapter for altering flow through a pipe from claim 1 wherein the alteration is the speed of the flow through the section of pipe.

3. The pipe adapter for altering flow through a pipe from claim 1 wherein the flow is air.

4. The pipe adapter for altering flow through a pipe from claim 1 wherein the pipe adapter includes a detail to engage around the sensor.

5. The pipe adapter for altering flow through a pipe from claim 1 wherein the pipe adapter includes fittings to place the sensor within the center of the pipe adapter.

6. The pipe adapter for altering flow through a pipe from claim 1 wherein the sleeve is configured to allow a plurality of sleeves to nest within each other to provide a variable cross sectional area in the pipe adapter to allow interchangeability with sensors having different flow requirements.

7. The pipe adapter for altering flow through a pipe from claim 1 wherein the sensor is an oxygen sensor.

8. The pipe adapter for altering flow through a pipe from claim 1 wherein the sensor is a mass flow sensor.

9. The pipe adapter for altering flow through a pipe from claim 1 wherein the sleeve increases the turbulent flow within the pipe adapter.

10. The pipe adapter for altering flow through a pipe from claim 1 wherein the sleeve increases the laminar flow within the pipe adapter.

11. The pipe adapter for altering flow through a pipe from claim 1 wherein the sleeve induces a rotation in the airflow through the pipe adapter.

12. The pipe adapter for altering flow through a pipe from claim 1 wherein the sensor is located where the flow reduced area of the sleeve.

13. The pipe adapter for altering flow through a pipe from claim 1 wherein the at least one sleeve is plastic.

14. The pipe adapter for altering flow through a pipe from claim 1 wherein the pipe adapter is plastic.

15. The pipe adapter for altering flow through a pipe from claim 1 wherein the at least one sleeve is bonded inside the pipe adapter.

16. The pipe adapter for altering flow through a pipe from claim 1 wherein the at least one sleeve is threaded into the pipe adapter.

17. The pipe adapter for altering the flow through a pipe from claim 1 wherein the sleeve is installed or removed without requiring the removal of the sensor.

18. The pipe adapter for altering the flow through a pipe from claim 1 wherein different adapters are used to attach various sensors to the sleeve.

19. The pipe adapter for altering the flow through a pipe from claim 2 that further includes an adapter that allows the height of the sensor to be adjusted relative to the center of the pipe adapter.

20. A pipe adapter for altering flow through the pipe comprising:
    a sensor with flow requirements placed within the section of tubing for conducting flow;
    at least one sleeve with an outside diameter that effectively matches the inside diameter of the section of tube for conducting flow;
    an inside diameter that alters the flow within the section of tubing for altering the flow to match the flow requirements to the sensor, and
    wherein the sleeve is configured to allow a plurality of sleeves to nest within each other to provide a variable cross sectional area in the pipe adapter to allow interchangeability with sensors having different flow requirements.

* * * * *